United States Patent
Lin (10) Patent No.: US 7,051,077 B2
(45) Date of Patent: May 23, 2006

(54) FUZZY LOGIC VOTING METHOD AND SYSTEM FOR CLASSIFYING E-MAIL USING INPUTS FROM MULTIPLE SPAM CLASSIFIERS

(75) Inventor: Wei Lin, Denver, CO (US)

(73) Assignee: MX Logic, Inc., Denver, CO (US)

( * ) Notice: Subject to any disclaimer, the term of this patent is extended or adjusted under 35 U.S.C. 154(b) by 139 days.

(21) Appl. No.: 10/873,882

(22) Filed: Jun. 22, 2004

(65) Prior Publication Data

US 2004/0267893 A1    Dec. 30, 2004

Related U.S. Application Data

(60) Provisional application No. 60/483,734, filed on Jun. 30, 2003.

(51) Int. Cl.
*G06F 15/16* (2006.01)

(52) U.S. Cl. .................................................. 709/207

(58) Field of Classification Search ............... 709/207, 709/217, 203, 223, 225
See application file for complete search history.

(56) References Cited

U.S. PATENT DOCUMENTS

| | | | |
|---|---|---|---|
| 6,052,709 A | 4/2000 | Paul | |
| 6,141,686 A | 10/2000 | Jackowski et al. | |
| 6,161,130 A | 12/2000 | Horvitz et al. | |
| 6,192,360 B1 | 2/2001 | Dumais et al. | |
| 6,249,805 B1 | 6/2001 | Fleming, III | |
| 6,321,267 B1 * | 11/2001 | Donaldson | 709/229 |
| 6,421,709 B1 | 7/2002 | McCormick et al. | |
| 6,493,007 B1 * | 12/2002 | Pang | 715/835 |
| 6,507,866 B1 | 1/2003 | Barchi | |
| 6,546,416 B1 * | 4/2003 | Kirsch | 709/206 |
| 6,643,686 B1 * | 11/2003 | Hall | 709/206 |
| 6,650,890 B1 * | 11/2003 | Irlam et al. | 455/412.1 |
| 6,654,787 B1 | 11/2003 | Aronson et al. | |
| 6,711,615 B1 | 3/2004 | Porras et al. | |
| 6,757,830 B1 | 6/2004 | Yarbotton et al. | |
| 6,769,016 B1 | 7/2004 | Rothwell et al. | |
| 6,772,196 B1 | 8/2004 | Kirsch et al. | |
| 6,802,012 B1 * | 10/2004 | Smithson et al. | 726/24 |
| 6,868,498 B1 * | 3/2005 | Katsikas | 726/14 |

(Continued)

OTHER PUBLICATIONS

Sergeant, Internet Level Spam Detection and SpamAssassin 2.50, MessageLabs.

(Continued)

*Primary Examiner*—David Y. Eng
(74) *Attorney, Agent, or Firm*—Faegre & Benson LLP (57) ABSTRACT

A method, and corresponding system, for identifying e-mail messages as being unwanted junk or spam. The method includes converting the outputs of a set of e-mail classification tools into a standardized format, such as a probability having a value between zero and one. The standardized outputs of the classification tools are then input to a voting mechanism which uses a voting algorithm based on fuzzy logic to combine the standardized outputs into a single classification result. The use of a fuzzy logic algorithm creates a more useful result as the classifier results are not merely averaged. In one embodiment, the single classification result is itself a probability that is provided to a spam classifier or comparator that functions to compare the single classification result to a spam threshold value and based on the comparison to classify the e-mail message as spam or not spam.

20 Claims, 4 Drawing Sheets

U.S. PATENT DOCUMENTS

| | | |
|---|---|---|
| 2003/0101181 A1 | 5/2003 | Al-Kofahi et al. |
| 2003/0158905 A1 | 8/2003 | Petry et al. |
| 2003/0167402 A1 | 9/2003 | Stolfo et al. |
| 2003/0172294 A1 | 9/2003 | Judge |
| 2003/0187942 A1 | 10/2003 | Quine et al. |
| 2004/0177110 A1 | 9/2004 | Rounthwaite et al. |
| 2004/0177120 A1 | 9/2004 | Kirsch |

OTHER PUBLICATIONS

Graham, Better Bayesian Filtering, Jan. 2003.

* cited by examiner

FUZZY LOGIC VOTING METHOD AND SYSTEM FOR CLASSIFYING E-MAIL USING INPUTS FROM MULTIPLE SPAM CLASSIFIERS

CROSS-REFERENCE TO RELATED APPLICATIONS

This application claims the benefit of U.S. Provisional Application No. 60/483,734, filed Jun. 30, 2003, which is incorporated herein by reference in its entirety.

BACKGROUND OF THE INVENTION

1. Field of the Invention

The present invention relates, in general, to network security systems such as firewalls and filters or other devices used in such systems for identifying and filtering unwanted e-mail messages or "spam" and, more particularly, to a method and system for classifying an e-mail message as spam by standardizing, tuning, and then, combining outputs of a plurality of spam classifiers or classification tools using a fuzzy logic voting algorithm or formula.

2. Relevant Background

The use of the Internet and other digital communication networks to exchange information and messages has transformed the way in which people and companies communicate. E-mail or electronic mail is used by nearly every user of a computer or other electronic device that is connected to a digital communication network, such as the Internet, to transmit and receive messages, i.e., e-mail messages. While transforming communications, the use of e-mail has also created its own set of issues and problems that must be addressed by the information technology and communications industries to encourage the continued expansion of e-mail and other digital messaging.

One problem associated with e-mail is the transmittal of unsolicited and, typically, unwanted e-mail messages by companies marketing products and services, which a recipient or addressee of the message must first determine is unwanted and then delete. The volume of unwanted junk e-mail message or "spam" transmitted by marketing companies and others is increasing rapidly with research groups estimating that spam is increasing at a rate of twenty percent per month. Spam is anticipated to cost corporations in the United States alone millions of dollars due to lost productivity. As spam volume has grown, numerous methods have been developed and implemented in an attempt to identify and filter or block spam before a targeted recipient or addressee receives it. Anti-spam devices or components are typically built into network firewalls or Message Transfer Agents (MTAs) and process incoming (and, in some cases, outgoing) e-mail messages before they are received at a recipient e-mail server, which later transmits received e-mail messages to the recipient device or message addressee.

Anti-spam devices utilize various methods for classifying or identifying e-mail messages as spam including: domain level blacklists and whitelists, heuristics engines, statistical classification engines, checksum clearinghouses, "honeypots," and authenticated e-mail. New methods are developed on an ongoing basis as spam continues to change and evolve. Each of these methods may be used individually or in various combinations. While providing a significant level of control over spam, existing techniques of identifying e-mail messages as spam often do not provide satisfactory results. For example, some techniques are unable to accurately identify all spam, and it is undesirable to fail to identify even a small percentage of the vast volume of junk e-mail messages as this can burden employees and other message recipients. On the other hand, some spam classification techniques can inaccurately identify a message as spam, and it is undesirable to falsely identify messages as junk or spam, i.e., to issue false positives, as this can result in important or wanted messages being blocked and lost or quarantined and delayed creating other issues for the sender and receiver of the messages. Hence, there is a need for a method of accurately identifying and filtering unwanted junk e-mail messages or spam that also creates no or few false positives.

As an example of deficiencies in existing spam filters, sender blacklists are implemented by processing incoming e-mail messages to identify the source or sender of the message and then, operating to filter all e-mail messages originating from a source that was previously identified as a spam generator and placed on the list, i.e., the blacklist. Spam generators often defeat blacklists because the spam generators are aware that blacklists are utilized and respond by falsifying the source of their e-mail messages so that the source does not appear on a blacklist. There are also deficiencies in heuristics, rules, and statistical classification engines. Rules or heuristics for identifying junk e-mails or spam based on the informational content of the message, such as words or phrases, are fooled by spam generators when the spam generators intentionally include content that makes the message appear to be a non-spam message and/or exclude content that is used by the rules as indicating spam. Spam generators are able to fool many anti-spam engines because the workings of the engines are public knowledge or can be readily reverse engineered to determine what words, phrases, or other informational content is used to classify a message as spam or, in contrast, as not spam.

In attempt to better classify e-mail messages, spam classification systems have been implemented that apply multiple spam classification tools to each message. Unfortunately, these combined tool systems have not been able to fully control the distribution of spam. Existing combined tool systems may poll each tool for its output or classification results. In some cases, the results are combined by Boolean or conditional logic, which leads to problems in obtaining useful or correct results when the number of classifiers becomes large. Additionally, two "weak" or marginal "not spam" results may be combined to produce a firm or final "no" unless complicated ad hoc conditions are used to make the combined determination a more proper "yes" or "spam" result. In some embodiments, the results of the tools are combined with each tool having an equal voice or each tool having one vote. For example, in a system using three classification tools, a message may be identified as spam when two of the three tools determine a message is spam. Such an equal voice polling technique is generally not effective because it does not take into account the "confidence" of each tool. This polling technique may be used because the outputs of each of the tools is not standardized and is difficult to combine. Other systems apply a score to the results of each tool and then average the scores, but, again, this results in an averaging or scoring that gives each classification tool an equal voice or vote, which may result in false positives or failure to identify a portion of received spam messages.

In other classification systems, one or more classification tool is allowed to overrule or trump the outputs of all the other tools, but this is undesirable when these tools may also be fooled or produce incorrect classification results. For example, some combined classification tool systems allow blacklist or whitelist classifiers to overrule heuristic and other classification tools. However, as indicated earlier, whitelists can be fooled by providing a false source of an e-mail message and blacklists can falsely identify e-mail as spam when a source is inappropriately added to the list of spam sources. As a result, existing techniques of providing more weight or confidence to particular classification tools have not been entirely successful in better identifying spam messages.

There remains a need for an improved method and system for accurately classifying e-mail messages as unwanted or as spam. Preferably, such a method and system would be adapted to utilize existing (or later developed) classification tools to produce a single classification result that is more accurate and reliable than the results of the individual classification tools. Further, such a method and tool preferably would allow later developed classification tools to be added to enhance the single classification result without significant modifications.

SUMMARY OF THE INVENTION

Generally, the present invention addresses the above problems by providing an e-mail classification system and method for more effectively identifying e-mail messages as unwanted or spam messages or as wanted or ham messages. Briefly stated, the present invention provides a method of controlling spam or unwanted e-mail messages in a more effective manner. The method involves combining the output of two or more (e.g., 2 to 5 or more) spam classifiers or e-mail message content classification tools to allow the classifiers to work more effectively in combination to identify e-mail messages as spam. To combine the classifiers, each classifier is given a single "vote" which are then combined in an intelligent manner using fuzzy logic rather than simply using a majority vote with equal vote weighting and/or conditional logic or simply finding that if any classifier identifies an e-mail message as spam the message is spam.

According to one aspect of the invention, an e-mail classification system is provided, such as at the perimeter of a network to avoid spam being received at a user device, that includes multiple spam classifiers. During operation of the system, an e-mail message is analyzed or classified by each of the 2 or more classifiers. The results are typically in varying form that cannot readily be combined. The e-mail classification system includes a voting mechanism for combining the results of the classifiers and for determining whether the e-mail is spam or "ham" (i.e., desirable e-mail). The voting mechanism functions first to convert each of the results into a standardized form that can be combined. In one embodiment, each of the classifier outputs or results is converted into a probability using empirical formulas. The probability, e.g., a number from 0 to 1, defines the likelihood the e-mail is or is not a spam message. For example, an embodiment may assign "0" as not being a spam message and "1" as being a spam message. The empirical formulas or methods used for such conversion may vary to practice the invention with an important part of the invention being the conversion of the classifier results into probabilities or other standardized classification results that lend themselves to more ready combination using the voting algorithm of the invention.

The voting mechanism further includes a voting chairman device or tool for deciding how the votes or standardized results from each classifier or classification tool are to be combined to arrive at a combined e-mail classification for the stacked classifiers. In one embodiment, a voting formula is implemented by the voting mechanism or module using a formula. For example, Bayesian analysis may be built upon and enhanced to provide a useful voting formula. In one preferred embodiment, the results of the combining or voting formula are probabilities or decimal numbers between 0 and 1, with numbers near 0 indicating that there is no or little likelihood that the message is spam and numbers near 1 indicating no or little likelihood that the message is not spam.

In practice, a classification system according to the invention then operates to compare the combined result against a threshold value or cutoff point to determine which messages are to be labeled or classified as spam and then, blocked or filtered from passing through the classification system. For example, a threshold of 0.95 may be used and any messages with a combined result from the voting formula of 0.95 or greater would be marked or labeled as spam and blocked by the classification system (or stored for further analysis). According to one aspect of the invention, the threshold value may be changed or tuned to achieve a desired result (e.g., a specified maximum number of false positives).

Additionally, the formulas used to convert the individual classifier results into a probability (or other standard value) typically include one or more parameter that can be specified or changed to tune or set the "trust" placed on each of the classifiers. For example, an initial setting for a conversion formula for a particular classifier may result in the classifier producing a result of 0.9 for an e-mail message. But, if the particular classifier is known to be more trustworthy or accurate than other classifiers in the stack then it may be useful to change the conversion parameter(s) such that the classifier has a converted result or probability higher than 0.9 (such as 0.91, 0.92, and the like). As will be seen from the following description of the voting formula, this higher converted probability will result in the conversion mechanism having a "stronger" vote because the classifier has more "confidence" in its determination or classification of the message as spam. Likewise, the vote of a classifier may be tuned to be "weaker" if the classifier is considered less trustworthy or accurate in identifying spam (e.g., by changing a parameter in the conversion formula to produce consistently lower or smaller probabilities for the classifier). The confidence of a classifier can generally be thought of as the closeness to 0 or to 1 of its converted result, e.g., a result of 0.99 is more confident than a result of 0.9 and a result of 0.01 has the same confidence of not spam as 0.99 does of spam.

According to other aspects of the invention, the classifiers may include a blacklist in which e-mail senders or sources are identified as always sending spam messages. For these classifiers, the conversion algorithm may simply provide for generating a probability of 1 if an e-mail sender or source is on the list and a 0.5 (or neutral) if not on the list or, alternatively, not including the classifier if not on the list. In some embodiments of the classification system, the voting mechanism is "trained" to control false positives such as by processing sets of known spam and not spam/acceptable e-mail messages to determine the number of false positives. In response to such processing, the parameters of the classifier conversion formulas used to generate the classifier probabilities can be changed or tuned and/or the threshold used in the comparisons can be lowered or raised to achieve a desired percentage of false positives or accuracy. Further, in some cases, the method of the invention includes responding to detected spammers' or spam senders' tricks or techniques by adjusting the workings of the voting mechanism. For example, spammers may generate spam that is known to get around or fool a particular classifier. As a result, it may be useful to set a minimum result or probability for that classifier that will not skew the combined results. In one case, a conversion formula is configured such that the lowest result for a classifier is "neutral" rather than providing an indication that the message is not spam (e.g., in the probability result embodiment, a probability of 0.5 is generated whenever the classifier is negative for indicating spam).

More particularly, a method is provided for classifying an e-mail message received over a digital communications network as either unwanted junk e-mail or spam. The method includes accessing an output from a first e-mail classification tool and an output from a second e-mail classification tool. Of course, the method often includes combining 3 or more tool outputs with 2 tools being used for simplicity of explanation of the method. The outputs are indicative of whether the tools found the e-mail message to be spam or not spam and as the tools differ, the formats or forms of the outputs typically differ or are non-standard (e.g., one may be a score, one may be a yes or no vote, one may be a probability, or the like). The method continues with converting the outputs from the first and second tools into first and second standardized outputs each complying with or having a standardized format or form. In one embodiment, each is a probability or a decimal number or fraction (such as a number or fraction between 0 and 1). A single classification output is generated by combining the first and second standardized outputs, and then, the single classification output is provided to a comparator or spam classifier that acts to compare the single output with a threshold value and based on the comparison to classify the e-mail message corresponding with the single output as spam or not spam. The single classification output is generated by inputting the standardized outputs from the two classification tools to a fuzzy logic-based voting algorithm. Generally, the voting algorithm is configured such that the single classification output has a higher confidence level than either of the standardized outputs when the two outputs both indicate the message is spam or is not spam.

DETAILED DESCRIPTION OF THE PREFERRED EMBODIMENTS

The present invention is directed to a new method, and computer-based systems incorporating such a method, for more effectively identifying or classifying e-mail messages as spam or ham and then filtering spam or unwanted junk e-mail messages. Briefly, the method comprises processing outputs or results from multiple e-mail classification tools (i.e., "classifiers") to produce standardized results that can be more readily combined, e.g., by converting each result into a probability or decimal value indicating the likelihood that an e-mail message is spam or not spam. The standardized classifier results are then processed by a voting chairman or control module based on a voting formula or algorithm. In a preferred embodiment, the voting formula utilizes fuzzy logic or intelligence in combining the standardized classifier results rather than employing simple averaging or the like. For example, two standardized results that individually would not indicate a message was spam might be combined by the voting formula to produce a single classification output that does indicate the message is spam (whereas an average, a Boolean-based result, or a conditional/sequential logic result likely would still fail to indicate spam). The single classification output of the voting formula is then provided to a spam classifier and filter mechanism for comparison with a spam threshold and for handling (e.g., filtering or passing) the message based on the comparison. In some embodiments, the inventive method further includes using feedback on the effectiveness of the classifiers in identifying spam messages to tune or train the conversion device and/or the voting formula so as to place more or less confidence on various classifiers, to "fix" classifiers, and/or to add or remove classifiers.

Figure 1:
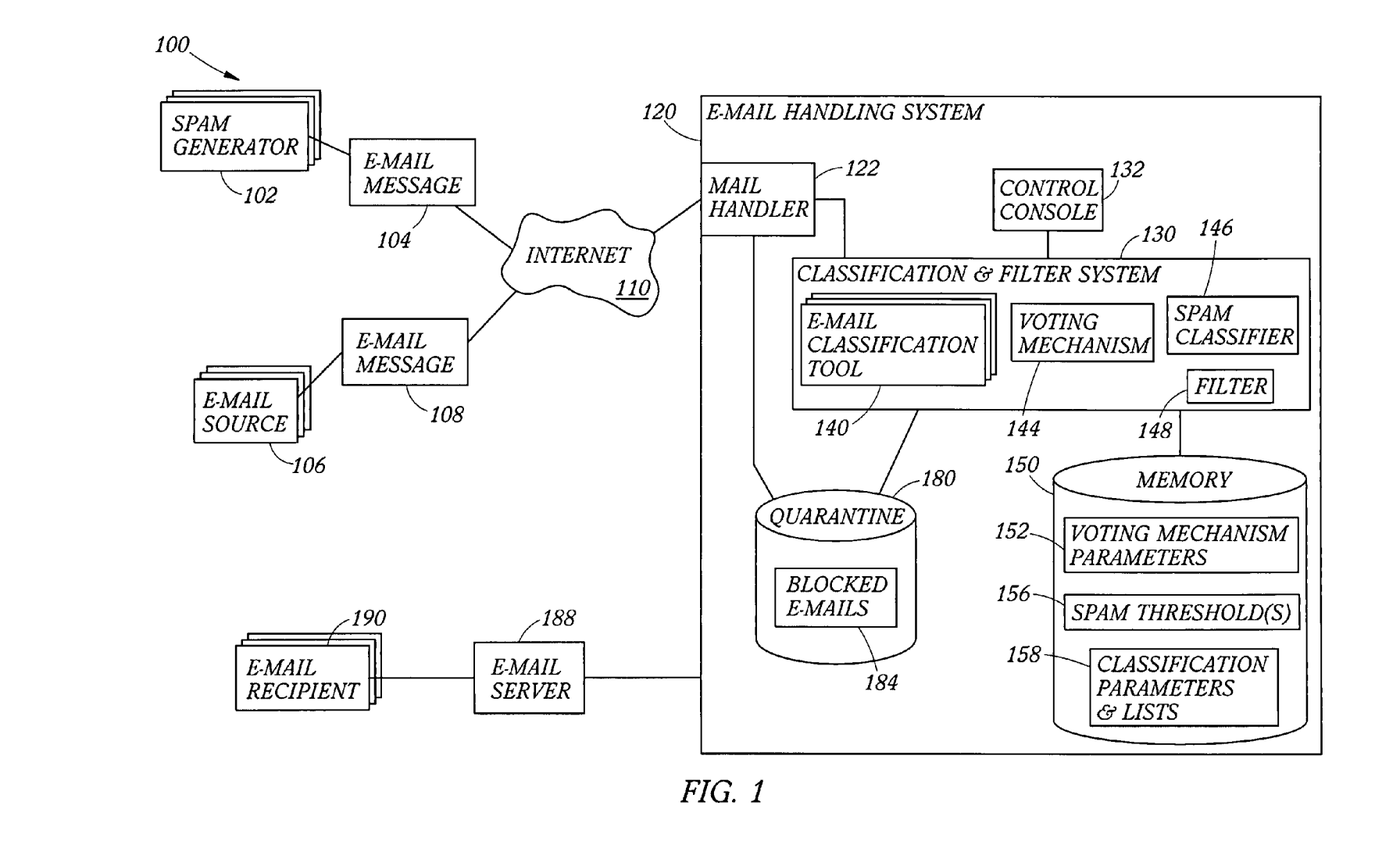
FIG. 1 illustrates in simplified block diagram form a network incorporating an e-mail handling system according to the invention that utilizes a voting mechanism or module within an e-mail classification and filter system to combine outputs from e-mail classification tools.
Figure 3:
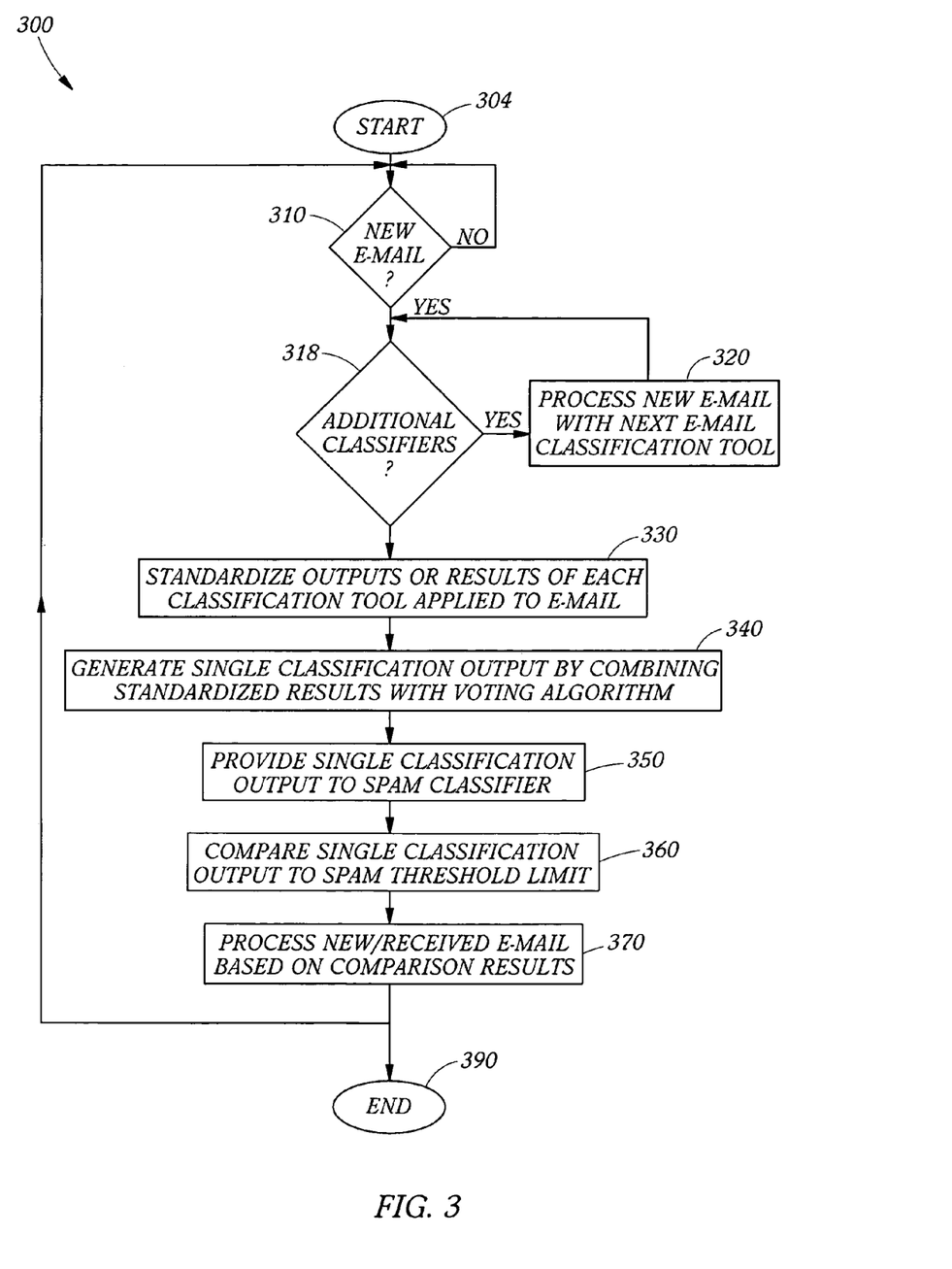
FIG. 3 illustrates a process for classifying a received e-mail message as spam or not spam utilizing multiple e-mail classification tools and combining their outputs with a voting mechanism, such as would be implemented by the e-mail handling system of FIGS. 1 and 2.
Figure 4:
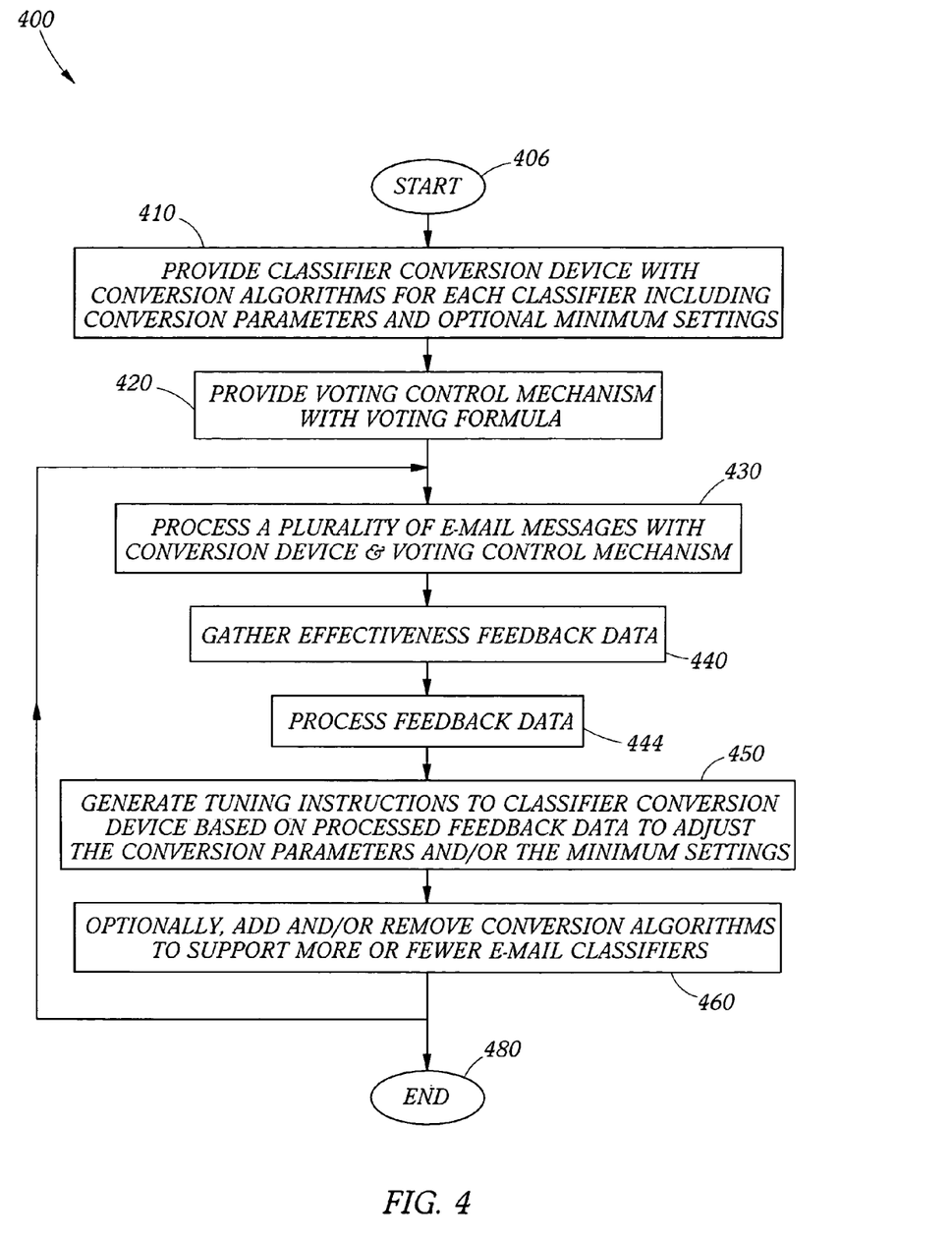
FIG. 4 illustrates a process for operating an e-mail classification portion of an e-mail handling system including periodic or ongoing tuning based on historical effectiveness data.

The following description begins with a description of a general communication system that incorporates an e-mail handling system according to the invention with reference to FIG. 1. Then, with reference to FIG. 2, a detailed explanation of a voting mechanism is provided including explanation of exemplary data and information flow among the components of an e-mail handling system. FIG. 3 illustrates processes carried out during operation of e-mail handling systems configured according to the present invention. FIG. 4 is provided to illustrate how tuning or training of classifier conversion devices and/or voting formulae can be achieved to provide ongoing enhancement of the effectiveness of an e-mail classification and filter system.

FIG. 1 illustrates one embodiment of a communication system 100 including an e-mail handling system 120 configured according to the present invention. In the following discussion, computer and network devices, such as the software and hardware devices within the systems 100 and 120, are described in relation to their function rather than as being limited to particular electronic devices and computer architectures and programming languages. To practice the invention, the computer and network devices may be any devices useful for providing the described functions, including well-known data processing and communication devices and systems, such as application, database, web, and e-mail servers, mainframes, personal computers and computing devices including mobile computing and electronic devices (particularly, devices configured with web browsers and applications for creating, transmitting, and receiving e-mail messages) with processing, memory, and input/output components and running code or programs in any useful programming language. Server devices and mail handlers are configured to maintain and then transmit digital data, such as e-mail messages, over a wired or wireless communications network.

Data, including transmissions to and from the elements of the system 100 and among other components of the system 100, typically is communicated in digital format following standard communication and transfer protocols, such as TCP/IP (including Simple Mail Transfer Protocol (SMTP) for sending e-mail between servers), HTTP, HTTPS, FTP, and the like, or IP or non-IP wireless communication protocols such as TCP/IP, TL/PDC-P, and the like. The invention utilizes computer code and software applications to implement many of the functions of the e-mail handling system 120 and nearly any programming language may be used to implement the software tools and mechanisms of the invention. Further, the e-mail handling system 120 may be implemented within a single computer network or computer system or as shown in FIG. 1 or with a plurality of separate systems or network devices linked by one or more communication networks, e.g., the control console 132, one or more of the e-mail classification tools 140, the voting mechanism 144, the spam classifier 146, the filter 148, the memory 150, and the quarantine 180 that can be thought of as "the e-mail classification portion" of the system 120 may be provided by a separate computer device or network of devices that are accessible by the e-mail handling system 120 (such as may be the case if the e-mail classification system is accessible on a subscription basis by a one or more e-mail handling systems).

Referring again to FIG. 1, the system 100 includes an e-mail handling system 120 connected to a communication network 110, e.g., the Internet (as shown), a local or wide area network, or the like. The e-mail handling system 120 provides the functions of identifying e-mail messages as unwanted junk or spam, of processing e-mails identified as spam, and of passing through e-mails not identified as spam. With reference to FIG. 1, the components of the system 100 are described with only a brief discussion of their functions, which is supplemented in later paragraphs with reference to FIGS. 2–4

The communication system 100 includes one or more spam generators 102 connected to the Internet 110 that attempt to transmit e-mail messages 104 to e-mail recipients 190. The e-mail messages 104 are unsolicited and, typically, unwanted by e-mail recipients 190, which are typically network devices that include software for opening and displaying e-mail messages and often, a web browser for accessing information via the Internet 110. The system 100 also includes one or more e-mail sources 106 that create and transmit solicited or at least "non-spam" or "ham" e-mail messages 108 over the Internet 110 to recipients 190. The spam generators 102 and e-mail sources 106 typically are single computer devices or computer networks that include e-mail applications for creating and transmitting e-mail messages 104, 108. The spam generators 102 are typically businesses that operate to market products or services by mass mailing to recipients 190 while e-mail sources 106 typically include individual computer or network devices with e-mail applications but that are operated by individuals attempting to provide solicited or acceptable communications to the e-mail recipients 190, e.g., non-spam messages which may vary depending on the definition of spam which may vary by system 100, by e-mail server 188, and/or by e-mail recipient 190. As will become clear, the e-mail handling system 120 is adapted to distinguish between the spam and non-spam messages 104, 108 by combining results or outputs of two or more e-mail classification tools 140 that are standardized and combined by a voting mechanism 144 to produce a single classification output for use by a spam classifier 146.

The e-mail handling system 120 is positioned between the network 110 and the e-mail server or destination server 188 and the e-mail recipients 190. The e-mail handling system 120 functions to accept inbound e-mail traffic destined for the e-mail server 188 and recipients 190, to analyze the e-mail messages 104, 108 to determine which messages should be filtered based on positive spam classifications or other filtering policies (such as attachment criteria, access criteria, and the like), to filter select messages, and to allow unfiltered e-mails (and e-mails released from quarantine 180) to pass to the e-mail server 188 for later delivery to or picking up by the e-mail recipients 190. To this end, the e-mail handling system 120 includes an e-mail handler 122 that acts to receive or accept e-mail messages 104, 108 destined for the recipients 190. The handler 122 may take any useful form for accepting and otherwise handling e-mail messages, and in one embodiment, comprises a message transfer agent (MTA) that creates a proxy gateway for inbound e-mail to the e-mail server or destination mail host 188 by accepting the incoming messages with the Simple Mail Transport Protocol (SMTP), e.g., is a SMTP proxy server. In this embodiment, the handler 122 acts to open a connection to the destination e-mail server 188. During operation, the handler 122 passes the e-mail messages 104, 108 through the classification and filter system 130 prior to streaming the messages to the e-mail server (e.g., destination SMTP server).

The e-mail handling system 120 includes classification and filter system 130 for parsing the received e-mail messages and for filtering messages based on default and user-specified policies. Messages identified as spam by the spam classifier 146 (such as based on a comparison of a single classification output to a spam threshold) or otherwise identified as a message to be filtered may be blocked or refused by the filter module 148, may be allowed to pass to the recipient 190 with or without tagging with information from the filter 148, and/or may be stored in a quarantine 180 as blocked e-mails 184 (or copies may be stored for later delivery or processing such as by the control console 132). The classification and filter system 130 may include spam, virus, attachment, content, and other filters 148 and may provide typical security policies often implemented in standard firewalls or a separate firewall may be added to the system 100 or system 120 to provide such functions.

The classification and filter system 130 implements 2 or more e-mail classification tools 140 for processing e-mail messages 104, 108 received by the mail handler 122 and for producing an output or result that is indicative of whether the message 104, 108 is likely to be spam or ham. Memory 150 is accessible by the classification and filter system 130 and stores classification parameters and/or lists used by the tools 140 in identifying spam. The particular classification tools 140 that are implemented may vary significantly to practice the invention, and as discussed previously, the classification tools 140 output a variety of outputs that are typically not standardized and cannot be readily combined.

The outputs of the classification tools 140 are passed to the voting mechanism 144 which acts to first standardize the outputs and then combine the outputs per a voting formula to generate a single classification output or value. In some embodiments, voting mechanism parameters are used to standardize the classification tool outputs and/or to implement the voting formula by providing confidence levels or tuning parameters for one or more of the classification tool outputs (e.g., some tools may show a better historical effectiveness and these tools would have a higher confidence parameter 152). A control console 132 is provided in the handling system 120 that allows a system administrator to, in some embodiments, view and modify the voting mechanism parameters 152 to train the voting mechanism (e.g., modify the outputs of the conversions, modify the voting formula, and the like) or the tuning may be achieved in a semi or fully automated fashion within the classification and filter system 130.

The single output of the voting mechanism 144 is passed to the spam classifier 146 which acts to compare the single output with one or more spam thresholds 156 in memory 150. If the threshold is exceeded, the message 104, 108 is classified as spam and the filter 148 is operated to handle the spam message, such as by storing the message as a blocked e-mail 184 in the quarantine 180. For example, the voting mechanism 144 may utilize a voting formula that outputs a probability or decimal value. The threshold 156 for spam messages may be set between 0.9 and 1.0, and when the voting mechanism 144 output is equal to or greater than the threshold probability, the spam classifier 146 identifies the message 104, 108 as spam. If the message 104, 108 is not classified as spam (or is otherwise marked for transmittal), the message 104, 108 is allowed to pass from the mail handler 122 to the e-mail server 188 and recipient 190.

The following is a brief description of spam classifiers and tools 140 that may be used in some embodiments of the invention but, again, the invention is not limited to particular methods of performing analysis of spam. Rather, the voting mechanism 144 is adapted for use with nearly any e-mail classification tool 140 and is readily useful with tools 140 that have not yet been identified or developed (as will be discussed with reference to FIGS. 2–4). For example, the classification tools 140 may include domain level blacklists and whitelists to identify and block spam. With these classifiers 140, a blacklist (such as lists 158) is provided containing e-mail addresses of spam generators 102 and e-mail messages 104, 108 having addresses in the list in a source field are classified as very likely to be spam by the tool 140, e.g., an output that is indicative of a high likelihood a message is spam. As discussed below, the voting mechanism 144 may standardize the results of a black list as a probability less than 1 to avoid having one tool 140 "winning" a voting process or trumping all other tools 140. Alternatively, whitelists include e-mail addresses of senders or sources (such as sources 106) for which e-mail is always accepted. Again, the voting mechanism 144 may standardize the output of a whitelist tool 140 to a probability greater than 0 to avoid a single tool 140 overruling all other tools 140 (e.g., a probability of 0.001, 0.01, or the like which can still be overruled by other tools 140 that classify a message as spam). Distributed blacklists take domain blacklists to a higher level by operating at the network level. Distributed blacklists catalog known spammer 102 addresses and domains and make these catalogs available via the Internet 110.

The classifiers 140 may also include heuristic engines of varying configuration for classifying spam in messages received by handler 122. Heuristic engines basically implement rules-of-thumb techniques and are human-engineered rules by which a program (such as modules 140) analyzes an e-mail message for spam-like characteristics. For example, a rule might look for multiple uses in a message's subject, content, and/or attachments of a word or phrase such as "Get Rich", "Free", and the like. A good heuristics engine 140 incorporates hundreds or even thousands of these rules to try to catch spam. In some cases, these rules may have scores or point values that are added up every time one rule detects a spam-like characteristic, and the engine 140 operates on the basis of a scoring system with a higher score being associated with a message having content that matches more rules. As can be seen, the non-standardized outputs of the blacklists and whitelists (i.e., yes or no) differ from the outputs of heuristics engines (e.g., a score).

The classification tools 140 may include statistical classification engines, which may take many different forms. A common form is labeled "Bayesian filtering." As with heuristics engines, statistical classification methods like Bayesian spam filtering analyze the content (or header information) of an e-mail message 104, 108. Statistical techniques often provide as output a probability that a given e-mail is spam based on how often certain elements or "tokens" within the e-mail have appeared in other messages determined to have been spam. To make the determination, these engines 140 compare a large body of spam e-mail messages with legitimate or non-spam messages for chunks of text or tokens. Some tokens, e.g., "Get Rich", appear almost only in spam, and thus, based on the prior appearance of certain tokens in spam, statistical classifiers 140 determine the probability that a new e-mail message received by the handler 122 with identified tokens is spam or not spam. Statistical spam classifiers 140 can be relatively accurate as they learn the techniques of spam generators as more and more e-mails are identified as spam, which increases the body or corpus of span to be used in token identification and probability calculations. The classification tools 140 may further include distributed checksum clearinghouses (DCCs) that use a checksum or fingerprint of the incoming e-mail message and compare it with a database of checksums of to identify bulk mailings. Honeypots may be used, too, that classify spam by using dummy e-mail addresses or fake recipients 190 to attract spam. Additionally, peer-to-peer networks can be used in the tools 140 and involve recipients 190 utilizing a plug in to their e-mail application that deletes received spam and reports it to the network or monitoring tool 140. Authenticated mail may also be used and the tools 140 may include an authentication mechanism for challenging received e-mails e.g., requesting the sender to respond to a challenge before the message is accepted as not spam.

E-mail identified as spam by the combined functioning of the e-mail classification tools 140, the voting mechanism 144, and the spam classifier 146 is then either blocked, blocked and copied as blocked e-mails 184 in quarantine 180, or allowed to pass to e-mail server 188 with or without a tag identifying it as potential spam or providing other information from the filter modules 148 (and in some cases, the operator of the system 120 can provide deposition actions to be taken upon identification of spam).

Figure 2:
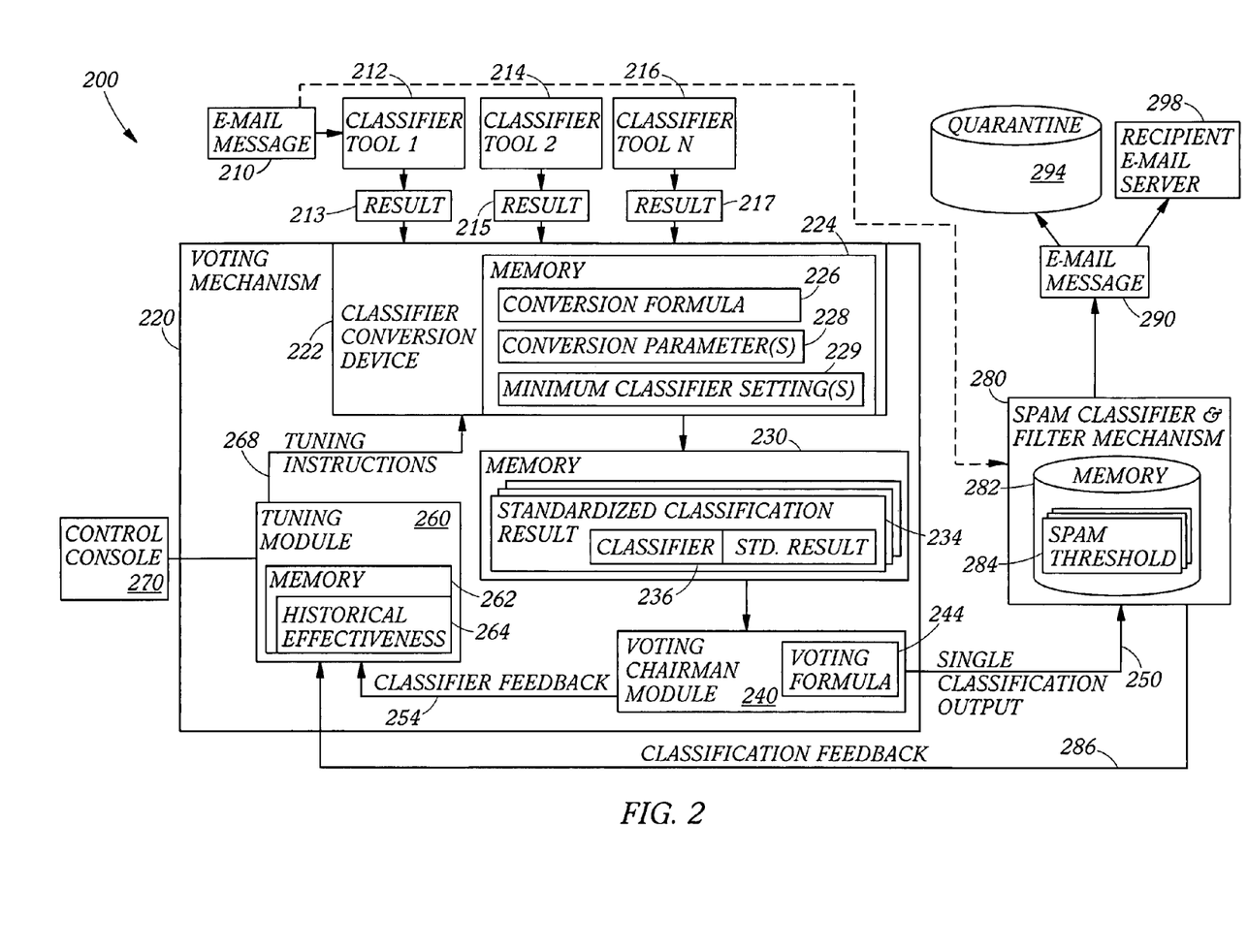
FIG. 2 illustrates with more specificity portions of an e-mail handling system, such as may be utilized in the network of FIG. 1, showing details of an exemplary voting mechanism and data flow within e-mail handling system.

With this understanding of the general components of the communication system 100 and more particularly, of the e-mail handling system 120 understood, a system 200 is illustrated in FIG. 2 that shows exemplary components within a voting mechanism that allow it to combine the non-standardized outputs of 2 or more classifiers to produce a single classification output, which can then be used by a spam classifier to classify an e-mail message. As shown, the system 200 comprises a set of classifier tools 212, 214, 216 that number from 2 to many. These tools 212, 214, 216 process an e-mail message 210 and produce results 213, 215, 217 that may take differing forms, and these results 213, 215, 217 are passed to a voting mechanism 220 for standardization and combination to produce a single classification output 250 of the voting mechanism 220.

The voting mechanism 220 includes a classifier conversion device 222 that functions to convert each classifier result 213, 215, 217 into a standardized classification result 234 that is stored in memory 230. Typically, each result 234 comprises a record with an identifier of the classifier and its corresponding standardized result, which facilitates the creation of feedback 254, 286 on the effectiveness of the classifiers 212, 214, 216 (as is explained below). To perform the conversion or standardization function, the classifier conversion device 222 includes memory 224 storing a conversion formula 226 for each classifier (although one formula may be used for more than one tool 212, 214, 216). The conversion formula 226 may include conversion parameters 228, such as multipliers, that are used in some embodiments to apply a level of confidence to the result 213, 215, 217. For example, classifier tool 214 may be a highly effective and trusted classifier, such as one based on historical effectiveness 264 stored in memory 260 of the tuning module 260, and a conversion parameter 228 for use in the conversion formula 226 for that classifier 214 may be chosen or set so as to increase the value of standardized classification result 230, thereby increasing the relative "weight" of the result 234 when it is combined with other results 230 by the voting chairman module 240. Similarly, the tool 212 may be less trusted, and its parameter(s) 228 may reduce its standardized result 234 so as to reduce the relative weight of the result 234 in producing the single classification output 250. For example, if a trusted classifier has a "yes" vote, the result 230 may be increased to make the result closer to "1" but if the trusted classifier indicates the e-mail is not spam, the result 230 may be decreased to make it closer to "0".

Further, for certain tools 212, 214, and/or 216, minimum (or maximum) classifier settings 229 are provided and are applied to produce the standardized results 234 by the conversion device 222. For example, when the single classification output is a probability or decimal number between 0 and 1, tool 216 may be a blacklist device that produces a yes or no (positive or negative) result. Instead of producing a probability of 1.0 or 0.0, a maximum value 229 may be set at 0.999 or less and a minimum value 229 may be set at 0.001 or higher to prevent the blacklist from dictating the value of the single classification output, i.e., other tools 212, 214 can overrule the blacklist tool 216 (which can be spoofed or fooled). In one embodiment, the blacklist probability ranges from 0.5 to less than 1. Similarly, a whitelist tool may be assigned a minimum/maximum classifier setting of less than 1.0 when a message is not found on a list (such as 0.5 or neutral probability) and a setting greater than 0 when a message is found (such as 0.001 or greater). Hence, in one embodiment, the whitelist output is set to range from greater than 0 to less than 0.5. Other tool types may also be assigned certain minimum/maximum settings to prevent the single classification output 250 being too heavily influenced by a single tool 212, 214, 216. In other words, a benefit of the voting formula 244 is that no one tool 212, 214, 216 determines its output 250, which makes the system 200 much more difficult to beat or fool by spam distributors or spammers.

The following are examples of conversions and formulae 226 implemented by the classifier conversion device 222, and similar conversions would be provided for each tool 212, 214, 216. In the following examples, the standardized classification results 230 are probabilities and are presented as decimal numbers ranging from 0 to 1, with numbers approaching 1 indicating that the tool 212, 214, or 216 determined that the message was spam and numbers approaching 0 indicating the opposite. The standardized results may take other forms to practice the invention with probabilities being one useful standard form that can be processed readily in a voting formula 244 to combine the various results 213, 215, 217.

In practice, a Bayesian classifier tool, such as tool 212, is configured to produce a result 213 that is a probability. Hence, the formula 226 may not be needed, or in some cases, the formula 226 is simply used to apply a conversion or confidence parameter to the Bayesian classifier tool (such as to increase the value of the resulting probability or to reduce the resulting probability due to the historical effectiveness 264 of the Bayesian tool).

For Spam Assassin™ and other classifiers that output a score, the following technique may be followed to convert the result 213, 215, 217 into a standardized result (or in this case, probability):

$$\text{Probability} = 1 - 0.5*(0.00001/0.05)**[(\text{score}-6000)/(\max(\text{score})-6000)]$$

wherein "score" is the output of the tool and the values of 0.05 and 0.00001 are conversion parameters 228 for a score based tool(s) that can be tuned by the tuning module 260. For example, the conversion parameters 228 can be tuned to do least $\chi^2$ fit to a data set (such as based on the results from the Bayesian classifier tool) although it may not be necessary in practice to do a regression. Other ranges of scores or score-based tool outputs are treated similarly, and of course, this is just an example of how a score may be converted to a standardized value and other formula may be used to practice the invention.

DCC and other classifier tools 212, 214, 216 that produce results 213, 215, 217 that are the number of times a message is encountered can be standardized using the following formula 226:

$$\text{Probability} = 1 - 1/(2 + [n/T])$$

where "n" is the number or result output, "T" is a threshold or parameter 228 to be determined, and "[n/T]" denotes the integral part of "n/T". For example, when T is 10 and the message is seen less than 10 times, the probability is assigned a value of 0.5 (or neutral) but when the message is seen 980 times (i.e., n=980), then the probability is 0.99. In some cases, it may be desirable to perform non-linear regression with the Bayesian classifier on the parameters 228 provided above to generate the following formula 226:

$$\text{Probability} = 1 - 1/(2 + a*[n/T]**m)$$

where a, T, and m are tunable conversion parameters 228 that can be modified by the tuning module 260 (or directly by the control console 270) with tuning instructions 268. Similarly, other classifiers can readily be analyzed to create formulas similar to those shown or unique that convert the results 213, 215, 217 into a standardized classification result 234 such as a probability with or without the use of tunable parameters 228.

The voting mechanism 220 includes a voting chairman or control module 240 that uses a voting formula 244 to combine the standardized classification results 234 in an intelligent manner, e.g., using fuzzy logic. This process can be thought of as each classifier 212, 214, 216 submitting their results 213, 215, 217 to participate in a voting that produces a single classification result or output 250. The voting formula 244 uses fuzzy logic votes so that it can account for the votes or standardized results 234 between a definite "yes" and a definite "no" vote (e.g., a probability of 1 and a probability of 0) in an elegant way. For example, several "maybe" or "somewhat certain" votes (e.g., probabilities between 0.8 and 0.9 when a spam threshold is 0.9 or higher) can build up or be combined to generate a "yes" single classification output 250 (i.e., a value greater than or equal to a threshold value 284). The voting formula 244 may be calibrated based on feedback 254, 286 by the tuning module 260 through tuning instructions 268. For example, the voting formula 244 may include confidence factors, e.g., parameters 228, that are applied to the standardized results 234 as part of the combining or voting process (e.g., instead of or in addition to the tuning parameters used in the conversion formulae 226).

In one preferred embodiment, the voting formula 244 used by the voting chairman module 240 to combine the standardized results 234 takes the following form:

$x=1;$ $y=1;$ for $(i=1, i++, i<=N)$ $x=x*p[i];$ $y=y*(1-p[i]);$

Single Classification Output or Probability, $P=x/(x+y)$ where p[i] is the i'th classifier's probability output of the N classifiers and P is greater than 0 and less than or equal to 1. The formula 244 can be used recursively. It can be used to combine N−1 classifiers and then combine these again with the N'th classifier. This exemplary voting formula 244 is an improved variation of the Bayes rule. Note, that in typical embodiments of the system 200 of FIG. 2, more confidence will be placed on outputs 250 of the voting formula 244 that are near the maximum and minimum values of a probability output (e.g., near 1 indicating a spam message and near 0 indicating relative certainty that a message is not spam).

The following examples of using the voting formula 244 to combine two or more classifiers are provided to more fully show the workings of the voting mechanism 240 in combining multiple classifiers without simply relying on averaging. When two classifiers are combined the formula 244 can be written as:

$P_{combined}=(P_1 \times P_2)/((P_1 \times P_2)+(1-P_1)(1-P_2))$

With this simplified equation 244, a first classifier may output a result that is standardized to a probability of 0.6 while a second classifier may also output a standardized result of 0.6. If averages were used, then the combined result would be 0.6. However, the combined probability ($P_{combined}$) for the voting formula 244 is 0.6923, which is higher than either vote. In other words, the voting formula 244 is configured to increase the certainty or confidence of two votes (either to a more confident "yes" or "no"). This becomes more clear when the first and second classifiers have standardized results of 0.9. When these results are combined with the voting formula, the combined probability is 0.9878, i.e., two relatively certain or yes votes become a single very confident yes output.

Two classifiers may cancel each other out when they are combined with the exemplary voting formula. For example, a first classifier may be relative confident that a message is not spam and produce a standardized classification result of 0.01 while the same message may be identified confidently by another classifier as spam with a standardized output of 0.99. In the voting formula, these two votes cancel each other out with the single classification output equally 0.50. However, if one classifier is more confident, then that vote overrules the less confident vote. For example, a "yes" vote of a classifier of 0.99 is overruled by a "no" vote of 0.001 with a single combined probability of 0.0902 (which indicates the message is likely not spam in this embodiment of the invention). Similarly, a "no" vote of 0.1 is overruled by a more confident "yes" vote of 0.999 which produces a combined vote or result of 0.9911 indicating the message is likely spam.

Further, when three classifiers are used in a system 200, two yes votes that are equally confident as a single no vote will overcome the no vote. For example, if two classifiers identify a message as likely to be spam with standardized outputs of 0.99 while a third classifier identifies the same message as not likely to be spam with a standardized output of 0.01 (i.e., similar confidences), the voting formula produces a combined result of 0.99 indicating the message is likely spam.

Note, an absolute vote of 1 or 0 probability will overrule all other classifiers to produce a combined probability of 1 or 0. Hence, it is often preferable for the classifier conversion device 222 to employ conversion formula 226 and/or parameters 228 that do not allow such absolute votes. In one embodiment of the invention, absolute "yes" votes are allowed for some classifiers (such as blacklists) but no absolute "no" votes are allowed with minimum settings 229 of 0.001 and the like being assigned instead when a classifier produces an absolute "no" vote (such as a whitelist classifier). In other embodiments, no classifier is allowed to have an absolute "yes" vote, and the maximum setting 229 (or conversion parameter 228) is implemented to produce standardized results of 0.999 or less or the like when a classifier, such as a blacklist classifier, produces an absolute "yes" result 213, 215, 217. In this manner, it is less likely that fooling a single classifier 212, 214, or 216 will result in fooling the system 200 (e.g., failing to identify a spam message accurately).

It is important to recognize that the number or type of classifiers 212, 214, 216 is not fixed. Classifiers 212, 214, 216 can be modified or even removed without requiring altering the voting chairman module 240 or formula 244. Further, new classifiers 216 can be added at any time and the voting chairman module 240 will still be able to use the voting formula 244 to produce a single combined classification output 250. In some cases, a new conversion formula 226 may need to be provided for the new classifier (along with new conversion parameters 228 and/or minimum classifier settings 229) or, if appropriate, the new classifier 216 may be assigned an existing conversion formula 226. Once the classifier results 213, 215, 217 are standardized 234, the voting chairman module 240 operates without knowledge of or concern with the type of classifiers 212, 214, 216.

Referring again to FIG. 2, the single classification output 250 is provided to or transmitted to a spam classifier and filter mechanism 280. This mechanism 280 has a spam threshold 284 stored in memory 282 (or has access to such threshold) and acts to compare the single classification output 250 to the threshold 284. If the threshold is exceeded (or is matched as is the case in some embodiments), the message 210 is classified or identified as likely to be spam and if not, then the message is classified as ham or not spam. The processed message 290 is then passed either to quarantine 294 if classified as spam (or in some cases, spam messages are handled differently and these other handling methods are considered within the breadth of the invention) or to the recipient's e-mail server 298 for transfer to the recipient.

The voting mechanism 220 may also be adapted to facilitate training or tuning of the single classification output 250 based on trending and/or historical effectiveness data. For example, the operation of a classifier can be tracked by feedback 254 from the voting chairman module 240 that is stored by the training module 260 in memory 262 as historical effectiveness data 264. This information may include trending information that is useful for tuning, via tuning instructions 268, the conversion parameters 228 and/or minimum classifier settings 229 to make the classifier more effective or simply to place less or more confidence on its results 213, 215, 217. More specifically, in practice, it is generally desirable for a classifier 212, 214, 216 to produce standardized results 234 that are highly concentrated in distribution close to 0 or 1 or both, as this indicates the classifier is confident about its classifications and not often neutral or undecided. If historical effectiveness 264 indicates a different distribution, automated tuning via the tuning module 260 and tuning instructions 268 may be used to fix the classifier 212, 214, 216 and/or to place less confidence on its standardized results 234 (e.g., multiplying its results by a number less than 1 (such as 0.9, 0.8, and the like or 0.01, 0.001, and the like)) when the result is a "yes" vote) or increasing the results when they are a "no" vote) to reduce the standardized results 234 level of confidence. The tuning may also be manual with the control console 270 being operated by a human administrator who views the historical effectiveness 264 and makes appropriate adjustments by issuing tuning instructions 268 (or simply removing or replacing a classifier 212, 214, 216 that is not found to be effective).

Tuning feedback 286 may also come from the spam classifier 280. For example, the effectiveness of a classifier 212, 214, 216 may be called into question if the historical effectiveness data 264 indicates the classifier's results are contradicted on a regular basis by the final message classification of the spam classifier 280. More particularly, a classifier 212, 214, 216 may require tuning, fixing, or replacing if its results are rarely or never "correct" in the sense that by itself it fails to accurately classify the message 210 in a manner that matches the results of the comparison of the single classification output 250 with the spam threshold 284. In other words, a classifier that continually classifies messages as being unlikely to be spam may need tuning when the messages are often classified as spam by the spam classifier 280 based on the comparison of the output 25.0 of the voting chairman module 240 and the spam threshold 284. As will be appreciated by those in the art, the tuning may take numerous forms to practice the invention including modifying the conversion parameters 228, modifying the conversion formula 226, and modifying the classifier tool 212, 214, 216 itself to alter the results 213, 215, 217.

FIG. 3 illustrates an exemplary process 300 for classifying e-mails as spam or not spam (i.e., "ham") such as may be carried out by operation of the systems 100, 200 of FIGS. 1 and 2. At 304, the process 300 starts and this step may include configuring an e-mail handling system 120 with a voting mechanism 144, 220 that is adapted according to the invention with a classifier conversion device 222 and a voting chairman or control module 240. The voting mechanism 144, 220 is configured for the classifiers or classification tools 140, 212, 214, 216 included in the system 100, 200 to convert their outputs or results into a standardized form and to then combine the standardized outputs using a fuzzy logic voting algorithm 244 to produce a single classification output 250.

Once a system 100, 200 is initialized for operation, the process 300 continues at 310 with a new e-mail being received. At 318, the process 300 includes determining whether there are additional classifiers 140, 212, 214, 216 remaining to process the received message. If yes, then at 320, the e-mail message is processed by the next or a remaining classifier, with the classifier producing a classification result that may or may not comply with a predetermined standardized format (e.g., a probability given in decimal format as discussed above). Once it is determined that no additional classifiers remain in the set or stack of classifiers implemented at 304, then the outputs of all the classifiers applied to the e-mail message are processed to generated standardized results, i.e., results that comply with the predetermined standardized form or format (such as a decimal probability). Note, the conversion step 330 can be performed for each classifier after the classifier has produced its result rather than processing the entire set of classifier results as shown in FIG. 3, with the important aspect being that each of the classifier results are converted into a standardized format for later processing and combining.

At 340, a single classification output is generated by combining the standardized results. In preferred embodiments of the method 300, the combining is likened to a voting process and the standardized results are combined using a fuzzy logic-based voting formula that functions to combine the standardized results in a manner that significantly differs from simple averaging and from Boolean and conditional logic. For example, see the voting formula described in detail with reference to element 244 of FIG. 2. The generation step 340 comprises combining 2 or more standardized classifier results to produce a single result such as a probability that gives each vote or result equal weight but is does not average the 2 results. Instead, two almost certain votes (e.g., 0.9 and 0.9) can generate at 340 a more certain vote (e.g., 0.9878).

At 350, the single classification output is provided to a spam classifier, such as classifiers 146 or 280. At 360, the single classification output is compared to a tunable, predetermined and, typically, stored spam threshold to determine whether the message corresponding to the single classification output should be classified as spam or not spam. In most embodiments, the classifier determines whether the single classification output is equal to or greater than the spam threshold value, and when it is, classifying or labeling the message as spam and when not, then classifying or labeling the message as not spam. At 370, the classified e-mail message is processed or handled based on the results of the comparison, e.g., a message identified as spam may be tagged and/or quarantined or otherwise blocked and a non-spam message may be allowed to pass to its recipient. The process 300 may continue with waiting for and receiving additional e-mail messages at 320 or it may end at 390 (such as when the e-mail handling system is shutdown, the voting mechanism is shutdown or removed, or the like).

FIG. 4 illustrates a process 400 for operating a voting mechanism such as mechanism 144, 220 including tuning or training the mechanism based on effectiveness trends and data. At 406, the process 400 starts such as with identifying a set of classification tools 140, 212, 214, 216 that are to be used to process incoming e-mail messages within an e-mail handling system and for which it is desirable to be able to combine their outputs or results. At 410 the method 400 includes providing a classifier conversion device (such as device 222) with a conversion algorithm (such as formula 226) for each of the classification tools identified in step 406. At 410, conversion parameters and optionally, minimum/maximum classifier output settings are provided for use in the algorithms by the conversion device to produce standardized classification results having a desired standardized format and optionally, having minimum/maximum values.

At 420, the method 400 involves providing a voting control mechanism with a voting formula or a formula for combining classifier standardized results in an intelligent manner, e.g., using fuzzy logic or other computation techniques other than simple averaging or Boolean or conditional logic (although, in some cases, averaging and/or Boolean or conditional logic may be considered adequate once the inventive standardization step has been completed). For example, with reference to FIG. 2, a voting mechanism 220 may be configured at 420 to include the voting chairman module 240 that includes or has access to the voting formula 244.

At 430, a plurality of e-mail messages is processed with the conversion device and with the voting control mechanism. Such processing includes for each received e-mail converting the non-standard results or outputs of the classification tools into standardized classification results using one or more conversion formula and then, combining the standardized results using the voting formula to produce a single classification output (such as a combined probability). At 440, the method 400 includes gathering effectiveness feedback data. This data may include trending data indicating whether a classifier's results are distributed near confident "yes" and "no" votes, whether a classifier's results are often wrong based on it being overruled by the other classifiers or based on comparison of the single classification output to a spam threshold, and other similar data. At 444, the feedback of effectiveness data is processed 444 to parse or extract useful tuning or training information that can be manually or automatically analyzed to generate tuning instructions or make classifier removal or modification decisions.

At 450, tuning instructions are generated, such as by a tuning module 260 or a control console 132, 270. The instructions are transmitted to the classifier conversion device, which responds by altering the conversion parameters and/or the minimum settings. In some embodiments, the instructions are instead sent to the voting control mechanism because the voting formula includes confidence factors that are used to modify the standardized classification results for one or more classifiers as part of combining the set of standardized results into a single classification output. At 460, a classifier has been added or deleted from the system and in response, the method 400 includes adding or removing conversion algorithms corresponding to the added or deleted classifier and the method ends at 480 or continues at 430 with additional e-mail message processing. In this manner, the method 400 supports addition and removal of spam classification tools or classifiers on the fly and with minimal modification of a voting mechanism. This is useful because identification of spam is not a stagnant technology and new classification tools are continually being created and existing tools are being modified or withdrawn from use. Again, the new tools may or may not produce outputs having a standardized format, and the voting mechanism of the present invention is useful for allowing use of multiple classifiers by first converting their outputs to a common form and then, combining these commonly formatted outputs into a single classification output which can readily be compared with spam thresholds.

The voting mechanism 144, 220 is shown to be incorporated and used within an e-mail handling system 120, 200. However, those skilled in the art will understand that the features of the voting mechanism 144, 220 of the present invention may be used in many other systems, such as other messaging systems, and/or may be operated as a standalone device.

I claim:

1. A method for classifying an e-mail message received over a digital communications network as unwanted junk e-mail or spam, comprising:
    accessing an output from a first e-mail classification tool and an output from a second e-mail classification tool differing from the first e-mail classification tool, wherein the outputs are indicative of whether the e-mail message is spam and differ in format;
    converting the outputs from the first and second e-mail classification tools into first and second standardized outputs, respectively, having a predetermined standardized numerical format;
    generating a single classification output by combining the first and second standardized outputs; and
    providing the single classification output to a comparator for comparison with a spam threshold value for determining whether the e-mail message corresponding to the single classification output is spam.

2. The method of claim 1, wherein the single classification output generating comprises inputting the first and second standardized outputs into a voting algorithm, the voting algorithm being based on fuzzy logic not outputting an average of the first and second standardized outputs or using Boolean or conditional logic.

3. The method of claim 2, wherein the single classification output comprises a confidence level greater than either of the first and second standardized outputs when the first and second standardized outputs both indicate the message is spam or is not spam.

4. The method of claim 2, wherein the predetermined standardized numerical format is a decimal probability between 0 and 1 and wherein the voting algorithm comprises an equation including:

$$P_{combined} = (P_1 \times P_2)/((P_1 \times P_2) + (1-P_1)(1-P_2))$$

wherein $P_{combined}$ is the single classification output, $P_1$ is the first standardized output, and $P_2$ is the second standardized output.

5. The method of claim 4, further comprising accessing an output from a third e-mail classification tool differing from the first and second e-mail classification tools, wherein the output from the third tool differs in format from the outputs from the first and second tools, wherein the converting is performed upon the output from the third tool to produce a third standardized output having the predetermined standardized format, and further wherein the single classification output comprises performing the voting algorithm in an iterative fashion with the first, second, and third standardized outputs.

6. The method of claim 1, wherein the converting comprises inputting the output from the first e-mail classification tool into a first conversion algorithm and the output from the second e-mail classification tool into a second conversion algorithm.

7. The method of claim 6, wherein the first and second conversion algorithms each comprise a tuning parameter affecting a value of the first and second standardized outputs and wherein the method further comprises receiving a tuning instruction and altering one of the tuning parameters based on the tuning instruction.

8. The method of claim 6, further comprising accessing an output from a third e-mail classification tool and the converting comprises inputting the output from the third e-mail classification tool into a third conversion algorithm to generate a third standardized output, wherein the generating of the single classification output comprises iteratively combining the first, second, and third standardized outputs.

9. A voting method for use in combining outputs of two or more outputs from e-mail classification tools, comprising:
retrieving a first classification output corresponding to a classification process performed by a first e-mail classifier on an e-mail;
retrieving a second classification output corresponding to a classification process performed by a second e-mail classifier on the e-mail; and
generating a combined e-mail classification result by inputting the first and second classification outputs into a voting formula comprising:

$$P_{combined} = (P_1 \times P_2)/((P_1 \times P_2) + (1-P_1)(1-P_2))$$

wherein $P_{combined}$ is the combined e-mail classification result, $P_1$ is the first classification output, and $P_2$ is the second classification output and wherein the combined e-mail classification result, the first classification output, and the second classification outputs have values between 0 and 1.

10. The method of claim 9, further including retrieving a third classification output corresponding to a classification process performed by a third e-mail classifier on the e-mail and wherein the generating comprises performing the voting formula iteratively on the first, second, and third classification outputs.

11. The method of claim 9, further comprising prior to the generating of the combined e-mail classification result, converting the first and second classification outputs to a standardized form.

12. The method of claim 11 wherein the standardized form comprises a probability.

13. The method of claim 9 further comprising receiving the e-mail, performing the classification process with the first e-mail classifier on the e-mail to generate the first classification output, and performing the classification process with the second e-mail classifier on the e-mail to generate the second classification output.

14. The method of claim 13 further comprising comparing the combined e-mail classification output to a spam threshold value and when the comparing determines the spam threshold value is exceeded, classifying the e-mail as spam.

15. An e-mail handling system, comprising:
a set of classification tools for processing an e-mail message and generating a set of classification results indicating whether the tools determined the e-mail message to be spam, the classification results comprising at least two formats;
a conversion mechanism processing the classification results to convert each of the classification results into a predetermined standardized format, wherein the predetermined standardized format comprises a probability indicating a likelihood the e-mail message is spam; and
a voting mechanism operating to input the standardized classification results as input to a voting formula to generate a combined classification output comprising a probability that the e-mail message is spam.

16. The system of claim 15, further comprising a spam classifier comparing the combined classification output with a threshold value and based on the comparing, classifying the e-mail message as spam or as not spam.

17. The system of claim 15, further comprising a tuning module gathering historical data representative of an effectiveness of one of the classification tools and based on the gathered historical data, generating a tuning instruction to the conversion mechanism to modify the conversion processing performed on the classification result corresponding to the one classification tool to alter a value of the standardized classification result for the one classification tool.

18. The system of claim 15, wherein the voting formula comprises:

$$P_{combined} = (P_1 \times P_2)/((P_1 \times P_2) + (1-P_1)(1-P_2))$$

wherein $P_{combined}$ is the combined classification output, $P_1$ is a first one of the standardized classification results, and $P_2$ is a second one of the standardized classification results; and
wherein the standardized classification results are input into the voting formula iteratively with a first pair of the standardized classification results being $P_1$ in the second iteration and a third one of the standardized classification being $P_2$.

19. The system of claim 15, wherein the set of classification tools comprises at least three differing spam classification devices processing the e-mail message and generating the set of classification results.

20. The system of claim 19, wherein the predetermined standardized format is a decimal probability and the standardized classification results range from greater than zero to less than one.

* * * * *